United States Patent
Bahar et al.

(10) Patent No.: US 10,087,532 B2
(45) Date of Patent: Oct. 2, 2018

(54) ELECTROCHEMICAL COMPRESSOR UTILIZING AN ELECTROLYSIS

(71) Applicant: Xergy Inc, Georgetown, DE (US)

(72) Inventors: Bamdad Bahar, Georgetown, DE (US); Brian Kienitz, Seaford, DE (US); William Parmelee, Seaford, DE (US)

(73) Assignee: Xergy LTD, London (GB)

( * ) Notice: Subject to any disclaimer, the term of this patent is extended or adjusted under 35 U.S.C. 154(b) by 496 days.

(21) Appl. No.: 14/712,376

(22) Filed: May 14, 2015

(65) Prior Publication Data

US 2016/0024666 A1   Jan. 28, 2016

Related U.S. Application Data

(60) Provisional application No. 61/996,801, filed on May 14, 2014.

(51) Int. Cl.
| | |
|---|---|
| *C25B 1/12* | (2006.01) |
| *C25B 1/10* | (2006.01) |
| *C25B 9/10* | (2006.01) |
| *C25B 9/18* | (2006.01) |
| *H01M 8/18* | (2006.01) |

(52) U.S. Cl.
CPC ............... *C25B 1/12* (2013.01); *C25B 1/10* (2013.01); *C25B 9/10* (2013.01); *C25B 9/18* (2013.01); *H01M 8/186* (2013.01); *Y02E 60/366* (2013.01)

(58) Field of Classification Search
CPC . H01M 8/186; C25B 1/10; C25B 1/12; C25B 9/10; C25B 9/18
See application file for complete search history.

(56) References Cited

U.S. PATENT DOCUMENTS

| | | | | |
|---|---|---|---|---|
| 4,990,412 A | * | 2/1991 | Hersey | F25B 9/02 204/DIG. 4 |
| 2003/0062268 A1 | * | 4/2003 | Kosek | C25B 1/04 205/637 |
| 2004/0131902 A1 | * | 7/2004 | Frank | H01M 8/04007 429/421 |
| 2005/0008904 A1 | * | 1/2005 | Suppes | B60L 11/1881 429/9 |
| 2009/0130503 A1 | * | 5/2009 | Highgate | C25B 1/12 429/411 |

* cited by examiner

*Primary Examiner* — Nicholas A Smith
(74) *Attorney, Agent, or Firm* — Invention To Patent Services; Alex Hobson

(57) ABSTRACT

An electrochemical compression system utilizes an electrolyzer to electrolyze an electrochemically active working fluid, at a first pressure, into decomposition products that are reformed back into said electrochemically active working fluid by a fuel cell, at a higher pressure. Water may be electrolyzed into hydrogen and oxygen and stored in reservoir tanks at an elevated pressure and subsequently provided to a fuel cell for reforming. The hydrogen is provided to the anode side of a polymer electrolyte membrane fuel cell and the oxygen is provided to the cathode side. Water is reformed on the cathode side of the fuel cell at a higher pressure than the inlet to the electrolyzer. This pressure differential enable flow of the electrochemically active working fluid through a conduit from the cathode to the electrolyzer. This flow of fluid may be used in a heat transfer system.

6 Claims, 7 Drawing Sheets

$$AB \longrightarrow A^+ + B + e^- \quad \text{Anode Side}$$
$$A^+ + e^- \longrightarrow A \quad \text{Cathode Side}$$
$$AB \longrightarrow A + B \quad \text{Total Reaction}$$

$H_2O \longrightarrow 2H^+ + 1/2\, O_2 + 2e^-$     Anode Side $2H^+ + 2e^- \longrightarrow H_2$     Cathode Side $H_2O \longrightarrow H_2 + 1/2\, O_2$     Total Reaction

ELECTROCHEMICAL COMPRESSOR UTILIZING AN ELECTROLYSIS

CROSS REFERENCE TO RELATED APPLICATION

This application claims the benefit of U.S. provisional patent application No. 61/996,801 filed on May 14, 2014 and entitled Compression Of Electrochemical Compressor For Water Utilizing An Electrolyzer And A Fuel Cell Hydrogen Compressor In Combination.

BACKGROUND OF THE INVENTION

Field of the Invention

The present invention relates to the application of electrochemical compression of an electrochemically active working fluid in a vapor compression system utilizing an electrolyzer coupled with a fuel cell.

Background

The function of both refrigeration cycles and heat pumps is to remove heat from a heat source or reservoir at low temperature and to reject the heat to a heat sink or reservoir at high temperature. While many thermodynamic effects have been exploited in the development of heat pumps and refrigeration cycles, one of the most popular today is the vapor compression approach. This approach is sometimes called mechanical refrigeration because a mechanical compressor is used in the cycle.

Mechanical compressors account for approximately 30% of a household's energy requirements and thus consume a substantial portion of most utilities' base load power. Any improvement in efficiency related to compressor performance can have significant benefits in terms of energy savings and thus have significant positive environmental impact. In addition, there are increasing thermal management problems in electronic circuits, which require smaller heat pumping devices with greater thermal management capabilities.

Vapor compression refrigeration cycles generally contain five important components. The first is a mechanical compressor that is used to pressurize a gaseous working fluid. After proceeding through the compressor, the hot pressurized working fluid is condensed in a condenser. The latent heat of vaporization of the working fluid is given up to a high temperature reservoir often called the sink. The liquefied working fluid is then expanded at substantially constant enthalpy in a thermal expansion valve or orifice. The cooled liquid working fluid is then passed through an evaporator. In the evaporator, the working fluid absorbs its latent heat of vaporization from a low temperature reservoir often called a source. The last element in the vapor compression refrigeration cycle is the working fluid itself.

In conventional vapor compression cycles, the working fluid selection is based on the properties of the fluid and the temperatures of the heat source and sink. The factors in the selection include the specific heat of the working fluid, its latent heat of vaporization, its specific volume and its safety. The selection of the working fluid affects the coefficient of performance of the cycle.

For a refrigeration cycle operating between a lower limit, or source temperature, and an upper limit, or sink temperature, the maximum efficiency of the cycle is limited to the Carnot efficiency. The efficiency of a refrigeration cycle is generally defined by its coefficient of performance, which is the quotient of the heat absorbed from the sink divided by the net work input required by the cycle.

Any improvement in refrigeration systems clearly would have substantial value. Electrochemical energy conversion is considered to be inherently better than other systems because due to their relatively high exergetic efficiency. In addition, electrochemical systems are considered to be noiseless, modular, and scalable and can provide a long list of other benefits depending on the specific thermal transfer application.

SUMMARY OF THE INVENTION

Water based vapor phase compression systems utilizing an electrochemical compressor are described in U.S. Pat. No. 9,005,411, to Xergy Inc., entitled Electrochemical Compression System, U.S. Pat. No. 8,769,972, to Xergy Inc., and entitled Electrochemical Compressor And Refrigeration System and U.S. application Ser. No. 13/899,909 to Xergy Inc., and entitled Electrochemical Compressor Based Heating Element and Hybrid Hot Water Heater Employing Same; the entirety each reference is incorporated by reference herein. As described in these references, the working fluid is composed of two components, the electro-active component, frequently hydrogen, and a co-working fluid providing the phase change in the cycle. In modeling, it is apparent that the presence of hydrogen in the system reduces the overall efficiency as compared with the theoretical efficiency for the system utilizing only the phase change component. The present invention mitigates that impact by localizing the hydrogen required for operation of the electrochemical compressor to the proximity of the compressor section only. By introducing hydrogen gas in proximity of the membrane electrode assembly of the fuel cell, using hydrogen generated by a separate electrolyzer and removing the hydrogen on the exit side of the fuel cell, the efficiency of the system is increased and complexity of the system is decreased. In an exemplary embodiment, hydrogen produced by an electrolyzer is introduced to the anode side of the fuel cell and the fuel cell moves protons across the membrane along with water through electroosmotic drag. The protons react with oxygen, produced by an electrolyzer, on the cathode side of the fuel cell to reform water. This process reduces the impact of hydrogen gas on the compression system and reduces complexity of having to separate the hydrogen from the working fluid stream.

An exemplary electrochemical compressor system comprises an electrolyzer that is coupled with a fuel cell. The electrolyzer electrolyzes a electrochemical working fluid, at a first pressure, into decomposition products that are provided to one or more electrochemical cells, or fuel cell. The fuel cell transfers a first decomposition product across an ion exchange membrane where it recombines with a second decomposition product to reform the electrochemically active working fluid at a higher pressure. A reservoir tank may be configured between the electrolyzer and the fuel cell to store the decomposition products for subsequent deliver to the fuel cell. The decomposition products may be stored in the reservoir tanks at any suitable pressure, such as about 0.1 psia or more, about 2 psia or more, about 10 psia or more, about 50 psia or more, about 100 psia or more and any range between and including the pressure provided. The reservoir tank may store the decomposition products at an elevated pressure and the electrolyzer and fuel cell may operate at in a cyclical mode, wherein they oscillate from an operating mode at a first voltage, or output level, to a second operating mode at a second voltage, or output level. An output level may be considered the amount of decomposition product formed by the electrolyzer or the amount of electrochemically active working fluid formed by the fuel cell. A cyclical mode may have a period of oscillation in the range of second or hours. For example, the electrolyzer may operate for about 20 seconds and then the fuel cell may operate for about 20 seconds. There may be some overlap in operation of the electrolyzer and the fuel cell or they may operate at separate times. The electrolyzer and fuel cell may be operated in an alternating cyclical mode, wherein they run at substantially opposing times, with one having an output alternating with the other. In another embodiment, they are operated in a completely alternating mode, with the electrolyzer and fuel cell operating at completely different times. The fuel cell an electrolyzer may have different cyclical modes, or operate asynchronously, having a different shape, frequency and/or amplitude of operation.

An electrochemically active working fluid is a compound that can be electrolyzed into decomposition products that can be subsequently reformed back into the original electrochemically active working fluid. Further, one of the decomposition products is ionic and will react and pass through an ion exchange membrane of an electrochemical cell. Water is a preferred electrochemically active working fluid as it can readily be electrolyzed and reformed, as described herein, near room temperatures. Water is electrolyzed into hydrogen and oxygen. The hydrogen is provided to the anode side of a fuel cell, such as a polymer electrolyte membrane (PEM) fuel cell, where it reacts with the anode and is converted into protons. The protons pass across the polymer electrolyte membrane where they react with the oxygen from the electrolyzer to reform water, at a higher pressure than in the electrolyzer. A conduit between the fuel cell, or cathode side of the fuel cell, and the inlet of the electrolyzer creates a flow of the electrochemically active working fluid. The pressure difference from the cathode side of the fuel cell to the inlet to the electrolyzer creates the flow of the electrochemically active working fluid through the conduit. Other electrochemically active working fluids include any salt, ammonia ($NH_3$), sodium chloride (NaCl), hydrogen bromide (HBr) and the like.

The compression and subsequent flow the electrochemically active working fluid can be used in a heat transfer system. In an exemplary embodiment, the heat transfer system comprises a condenser, an expansion valve and an evaporator. The condenser may be used to heat an object or the air in an enclosure, for example, and likewise, the evaporator may be used to cool an object or air in an enclosure. A heat transfer system utilizing a compression system as described herein may be incorporated into a refrigerator or heat pump system. Heat transfer from a heat transfer device to a heat reservoir may be through conduction or convention. A heat sink may contact a condenser and draw heat from the condenser and a fan may blow over an evaporator to add heat to the evaporator through convection.

The electrolyzer requires an electrical power input to drive the electrolysis. For the electrolysis of water, a voltage of at least 1.23 volts at atmospheric pressure, and it is preferred to run the electrolyzer at a voltage of at least 1.4 volts to ensure proper reaction kinetics. The fuel cell operates in an electrical energy producing mode and electrical energy produced can be used to power the electrolyzer. The fuel cell may directly provide electrical power to the electrolyzer or an energy storage device, such as a battery or capacitor, may be coupled between the fuel cell and the electrolyzer to store electrical energy for subsequent use. The electrolyzer may operate during periods of low electrical power cost, such as at night, and the fuel cell may operate during the day when the electrical power costs are higher.

The fuel cell may be used to power any other device of the compressor or heat transfer system as well, such a fan or blower. In addition, the fuel cell may be used to power any other auxiliary device that is not part of the compressor or heat transfer system.

A control system may be coupled with various components of the compressor and/or heat transfer system to control various functions. In an exemplary embodiment, a user interface having a temperature set point input provides an input to the control system. The control system may then control the operation of the compressor system to heat or cool as required by the user input. The control system may regulate the power supply to the electrolyzer, the power generated by the fuel cell and or the operating level of the fuel cell, such as voltage level. The control system may regulate the pressure of the reservoir tanks and control the opening of valves to provide the decomposition products to the fuel cell. The control system may regulate a pressure valve of the conduit and thereby control the flow of the electrochemically active working fluid through the system. A control system may comprise a microprocessor and various user interfaces for programming the system. The control system may control the function of the electrolyzer and fuel cell such that they operate in a cyclical mode, as described herein.

An exemplary electrochemical cell comprises a polymer electrolyte membrane comprising polar ionic groups attached to nonpolar chains. Examples of this type of ionomer are sulfonated perfluorinated polymer or a sulfonated polymer. An ion exchange membrane may comprise an ionomer that is mechanically reinforced with a non-ionic fibrous material, such as a polymer membrane and particularly expanded polytetrafluoroethylene (PTFE). A mechanically reinforced ionomer membrane may be desired to better resist pressure differences between the anode and cathode side of the electrochemical cell and/or to minimize the cost of the expensive ionomer material.

An exemplary electrolyzer is a PEM electrolyzer comprising an ion exchange membrane configured between an anode and a cathode. A PEM electrolyzer reacts with water on an anode side to produce oxygen and protons that are transported across the ion exchange membrane to the cathode, where the protons are converted into hydrogen. Both the oxygen and hydrogen outlet streams will comprise water.

In an exemplary embodiment, a method is provided for pressurizing an electrochemically active working fluid comprising the steps of providing an electrochemical compressor system, as described herein, and electrolyzing said electrochemically active working fluid into decomposition products and reforming, through the use of an electrochemical cell, or fuel cell. In this method, the electrochemically active working fluid is provided to the electrolyzer at a first pressure, is electrolyzed into decomposition products that are provided to the fuel cell, and the fuel cell reforms the electrochemically active working fluid at a second pressure that is higher than the first pressure. A closed loop may be formed wherein the electrochemically active working fluid is transferred completely through system and cycles through the system repetitively.

An electrochemical compressor comprises an electrolyzer that produces decomposition products of an electrochemically active working fluid to a fuel cell. The fuel cell transports one of the decomposition products, or a reacted product therefrom, across a membrane electrode assembly where it recombines with the other portion of the decomposition product to reform the electrochemically active working fluid. Pressure can be generated through a buildup of decomposition products from the electrolyzer or from transport through the fuel cell where the reformed electrochemically active working fluid can generate pressure.

The cooling system can include a condenser, compressor, and evaporator in thermal communication with an object to be cooled. The water working fluid gas is pressurized across the membrane electrode assembly by the local use of hydrogen for electro-osmotic pumping. At the cathode side of the electrochemical cell, oxygen from the remote electrolyzer is introduced to react and remove hydrogen generated, or directly with the protons crossing the polymer electrolyte membrane of the membrane electrode assembly. After the vapor refrigerant is compressed, it is forced through the condenser where the refrigerant is liquefied. The liquid refrigerant then passes through the evaporator where the liquid refrigerant is evaporated by absorbing heat from the object to be cooled. The working fluid then enters the electrochemical cell where the cycle is repeated. In this case the hydrogen is formed and consumed in the compressor unit before it reaches the condenser.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of his specification, illustrate embodiments of the invention, and together with the description serve to explain the principles of the invention.

DETAILED DESCRIPTION OF THE ILLUSTRATED EMBODIMENTS

Figure 1:
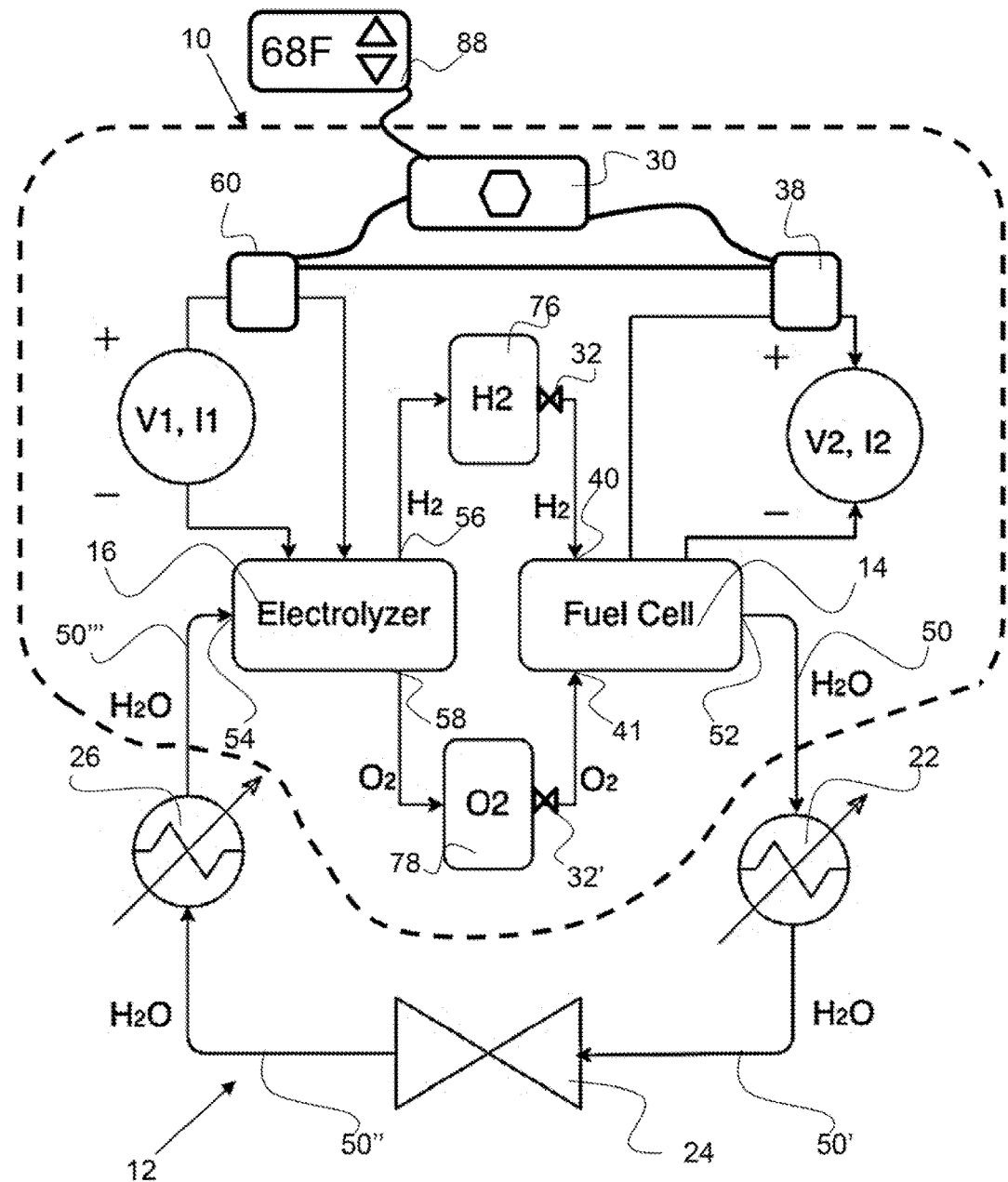
FIG. 1 shows a diagram of an electrochemical heat transfer system comprising an electrochemical compressor system that incorporates an electrolyzer.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience, and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an electrochemical heat transfer system 10 comprises an electrochemical compressor system 12 that incorporates an electrolyzer 16. The electrolyzer 16 produces oxygen and hydrogen that are provided to the electrochemical compressor 20. The electrolyzer may be any suitable type of electrolyzer, such as those shown in FIGS. 4 and 5, however an electrolyzer utilizing a membrane electrode assembly is preferred. A power supply 60 provides the required voltage and current to the electrolyzer to generate hydrogen and oxygen. A voltage of at least 1.23 volts at atmospheric pressure, is required for electrolysis of water. It is preferred to run the electrolyzer at a voltage of at least 1.4 volts to ensure proper reaction kinetics. The electrolyzer has an oxygen outlet 58 and hydrogen outlet 56. A conduit couples the electrolyzer outlets with the fuel cell 14, and reservoir tanks 76, 78 may be configured between the electrolyzer outlets and the fuel cell to store the gasses at an elevated pressure. As shown in FIG. 1, an oxygen reservoir tank 78 and hydrogen reservoir tank 76 have valves 32 that may be controlled by the control system to provide these gasses to the electrochemical compressor as required or as programmed. The fuel cell 14 has a hydrogen inlet 40 and an oxygen inlet 41. The fuel cell has an outlet 52 for the flow of water from the high pressure side of the electrochemical cell, or cathode side.

The electrochemical compressor comprises a fuel cell having one or more membrane electrode assemblies. The hydrogen is provided to the anode side and the oxygen is provided to the cathode side. The hydrogen is converted to protons which are transferred across a proton conducting membrane, such as a polymer electrolyte membrane. The protons then react with the oxygen on the cathode side to produce water. The production of water on the cathode side increases the pressure on the cathode or high pressure side of the electrochemical compressor. The hydrogen and oxygen are substantially consumed in the fuel cell reactions leaving substantially only water to flow through the conduit system 50-50''' and through the subsequent portions of the electrochemical heat transfer system including the condenser 22, expansion valve 24, and evaporator 26. The water then returns to the electrolyzer where it is then again converted into hydrogen and oxygen. In an alternative embodiment, a separate water supply is provided to either the electrolyzer and/or the fuel cell. A water supply may be required for any loss of fluid through the system and/or to provide additional moisture for the membrane electrode assembly. The conduit system includes one or more conduits that extend from the cathode side of the fuel electrochemical cell to the electrolyzer and any number of other components, such as a condenser or evaporator, for example, may be configured in line with the conduit system. The conduit system and any components configured in line, form a closed loop to transfer the electrochemically active working fluid form the fuel cell to the electrolyzer.

The electrochemical heat transfer system may be used to heat and/or cool an object by conducting with one of the components such as the condenser or evaporator. In another embodiment, an electrochemical heat transfer system may be used to heat or cool air by convection, including forced air, with the condenser or evaporator. The control system 30 may be coupled with an interface 88 that includes a set point for temperature of an object or a room, for example, and the control system may control the various systems and components of the electrochemical heat transfer system to provide heating and/or cooling. The fuel cell may be coupled with an energy storage device 38, such as a battery or capacitor, and electrical energy produced by the fuel cell may be stored for later use. The stored electrical energy from the fuel cell may be used to power the electrolyzer, or any other component of the system, or even an auxiliary electronic device, such a fan or blower configured to blow over the evaporator to cool an object or air. In an exemplary method, the electrolyzer is operated during low energy cost periods, such as late at night, and the hydrogen and oxygen stored in the reservoir tanks may be used to power the fuel cell far heating and/or cooling and the electrical energy produced by the fuel cell may be used for power during high energy cost periods, such as during the day time.

Figure 2:
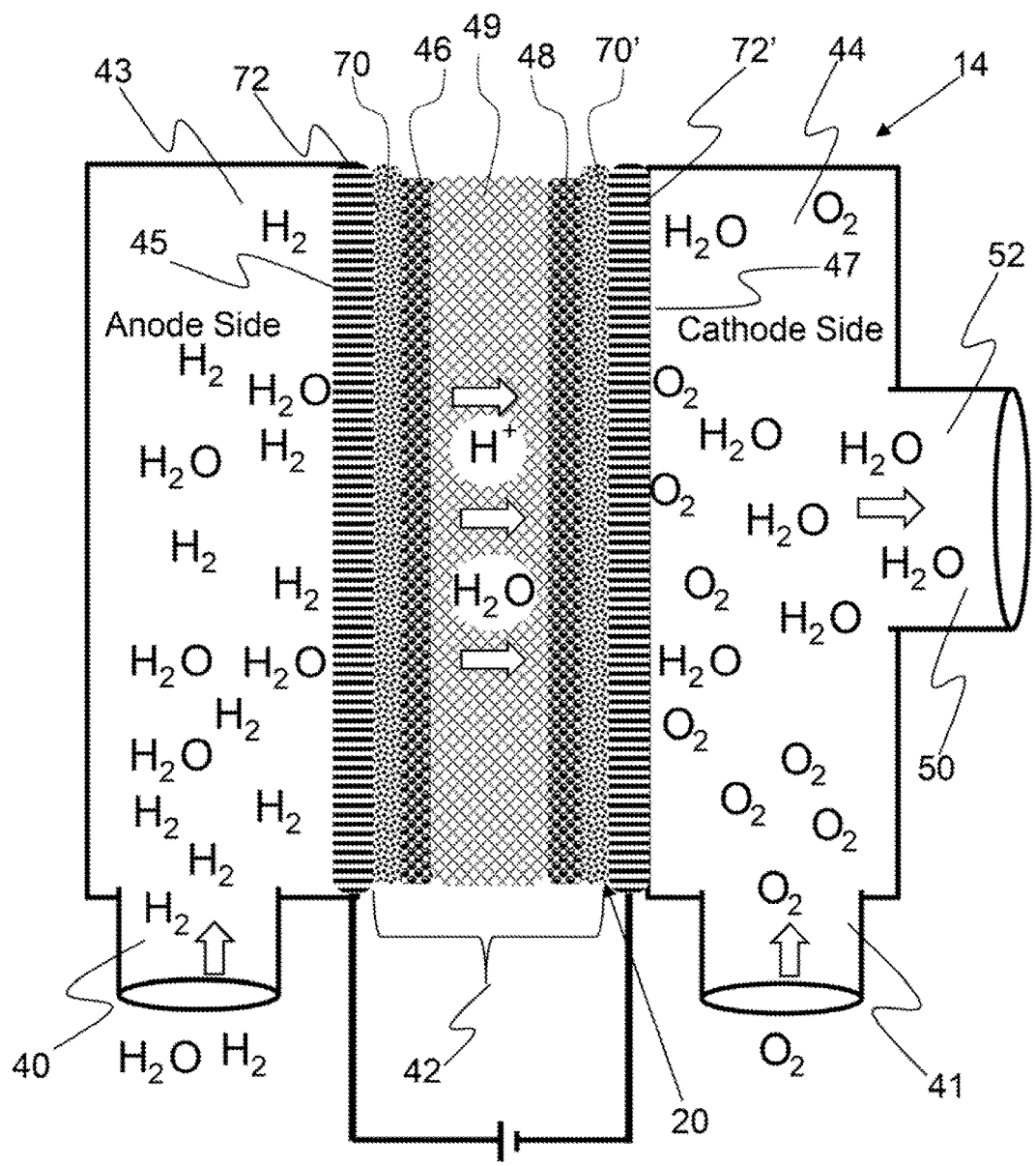
FIG. 2 shows a sectional view of an exemplary electrochemical compressor comprising a fuel cell.

As shown in FIG. 2, an exemplary fuel cell 14 comprises an electrochemical cell 20. The fuel cell comprises a membrane electrode assembly 42 comprising a proton conducting membrane 49, an anode 46 and cathode 48. A membrane electrode assembly may in some cases include a gas diffusion media 70, 70'. A flow field 72, 72', typically comprising an electrically conductive plate having channels for the delivery of gasses to the surface of the membrane electrode assembly, is configured on either side of the membrane electrode assembly. The anode side 45 of the fuel cell converts hydrogen to protons, $H^+$, which are then transported across the membrane to the cathode side 47. At the cathode, the protons react with oxygen to produce water and the water produced moves through the compressor outlet 52 and into conduit 50. This transfer, or pumping, of protons across the membrane produces an increased pressure on the cathode side. The anode side 45 is the low pressure side 43, and the cathode side 47 is the high pressure side 44 of the electrochemical compressor 20. The hydrogen inlet 40 and oxygen inlet 41 are shown.

Figure 3:
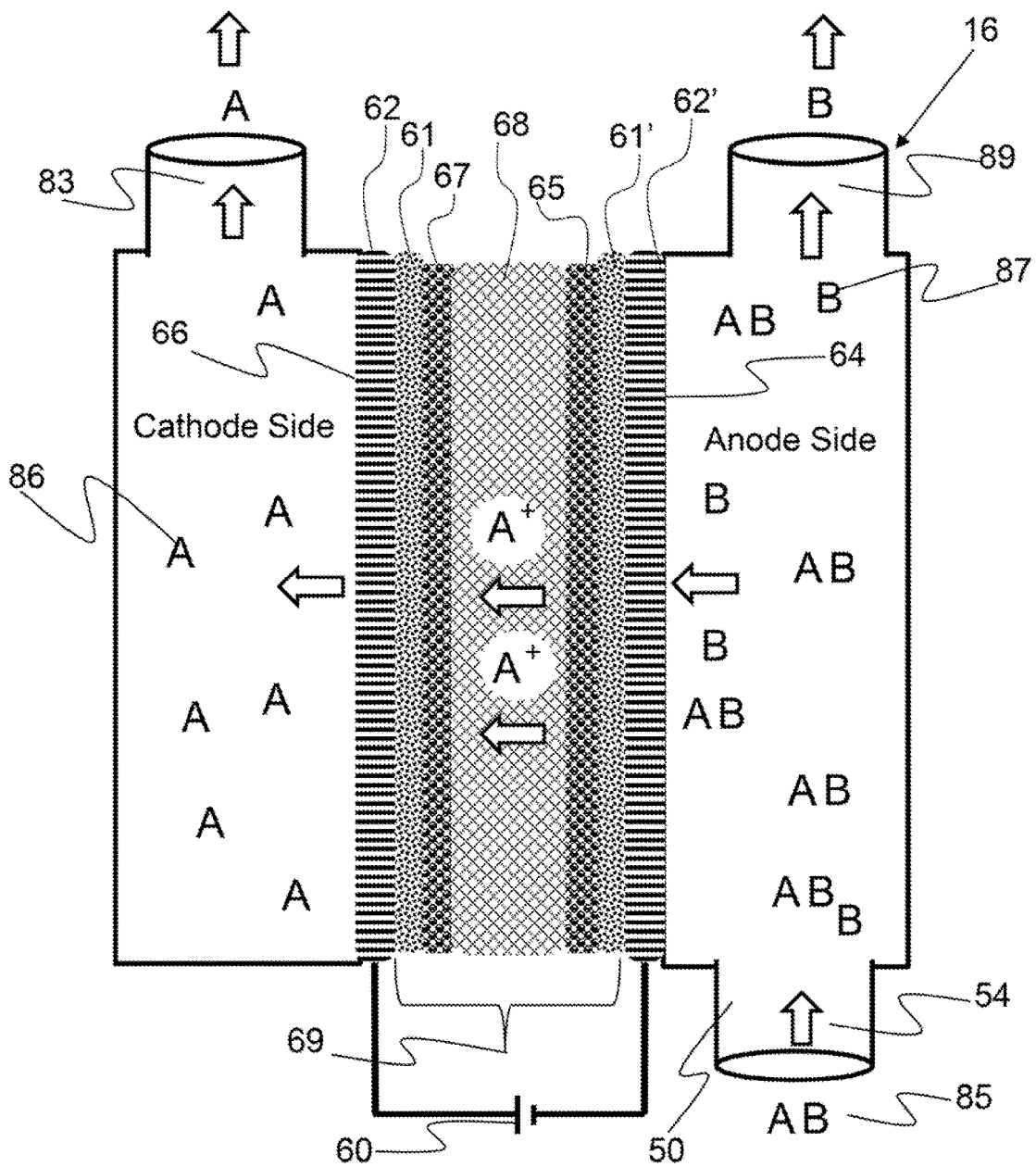
FIG. 3 shows a sectional view of an exemplary membrane electrolyzer comprising a membrane electrode assembly.

As shown in FIG. 3, an exemplary electrolyzer 16 comprises a membrane electrode assembly 69 having an anode 65, cathode 67 and a proton conducting membrane 68, such as a polymer electrolyte membrane. The membrane electrode assembly may also include a gas diffusion media 61, 61' on one or both sides. A flow field 62 may be configured on either side of the membrane electrode assembly to more evenly distribute gas over the surface. An electrochemically active working fluid 85 is introduced into the electrolyzer through the electrolyzer inlet 54. A power supply 60 provides the required voltage and current required to electrolyze the incoming electrochemically active working fluid into a first decomposition product 86, represented as "A", in FIG. 3, and a second decomposition product 87, represented as "B", in FIG. 3. The electrochemically active working fluid 85 is converted into the second decomposition product 87 on the anode side 64. The charged first decomposition products, represented as "$A^+$", moves through the membrane 68 to the cathode side. At the cathode, the charged first decomposition products are converted into the first decomposition products "A". The second decomposition product 87 exits the electrolyzer through the second decomposition outlet 89 and the first decomposition product 86 exits through the first decomposition product outlet 83. As described, the outlets may be coupled with a reservoir tank for storing the decomposition products prior to introduction to the fuel cell. The reaction equations for the anode, cathode and total reaction equation are provided in FIG. 4.

Figure 4:
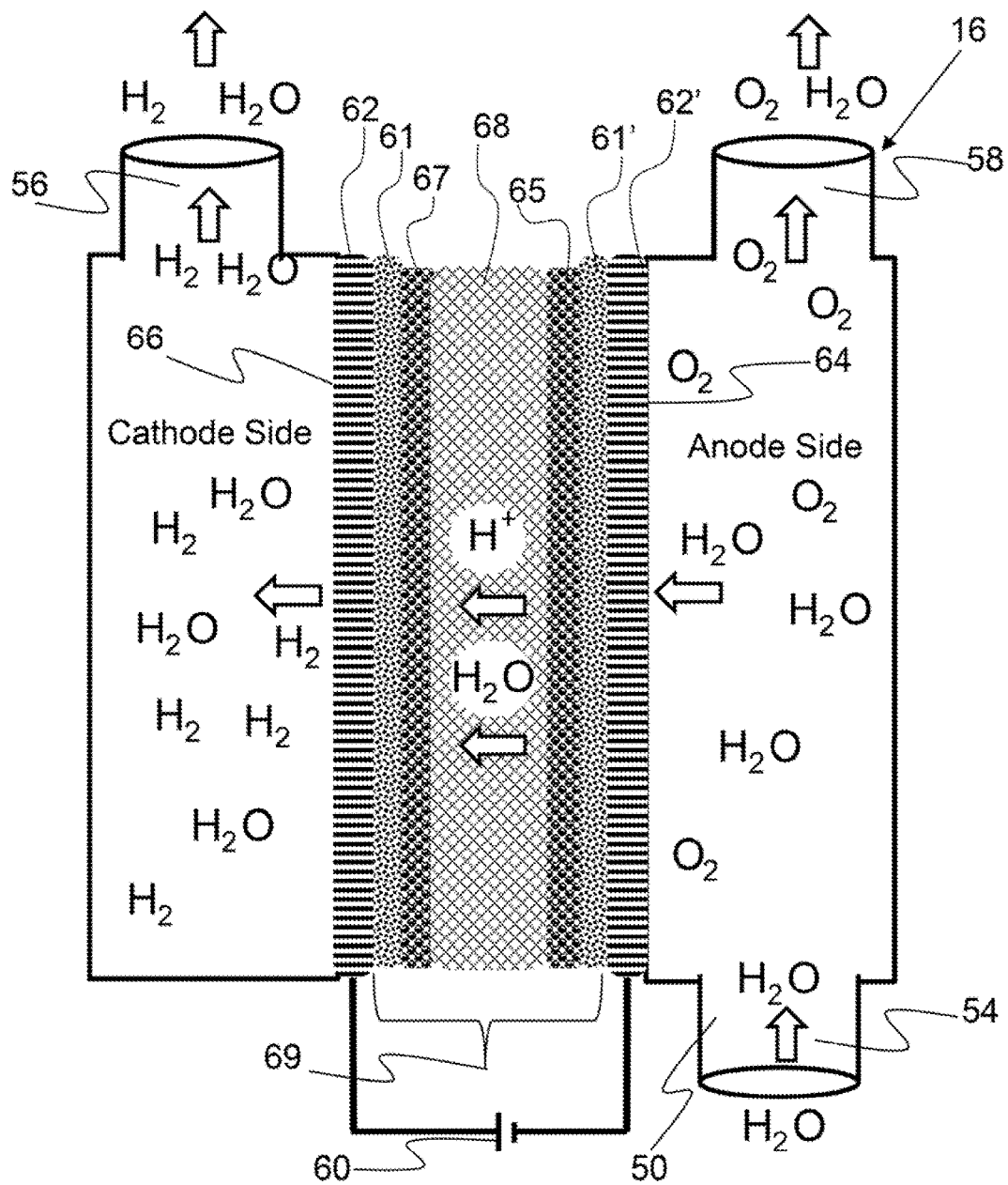
FIG. 4 shows a sectional view of an exemplary membrane electrolyzer comprising a membrane electrode assembly.

As shown in FIG. 4, an exemplary electrolyzer 16 comprises a membrane electrode assembly 69 having an anode 65, cathode 67 and a proton conducting membrane 68, such as a polymer electrolyte membrane. The membrane electrode assembly may also include a gas diffusion media 61,61' on one or both sides. A flow field 62 may be configured on either side of the membrane electrode assembly to more evenly distribute gas over the surface. Water is introduced into the electrolyzer through the electrolyzer inlet 54. A power supply 60 provides the required voltage and current required to electrolyze the incoming water into hydrogen and oxygen. The water is converted into the oxygen and protons on the anode side 64, and the protons move through the membrane 68 to the cathode side. At the cathode, the protons are converted into hydrogen. The oxygen exits the electrolyzer through the oxygen outlet 58 and the hydrogen exits through the hydrogen outlet 56. As described, the outlets may be coupled with a reservoir tank for storing the gasses prior to introduction to the fuel cell. The reaction equations for the anode, cathode and total reaction equation are provided in FIG. 4. As shown, water also exits the two outlets of the electrolyzer.

Figure 5:
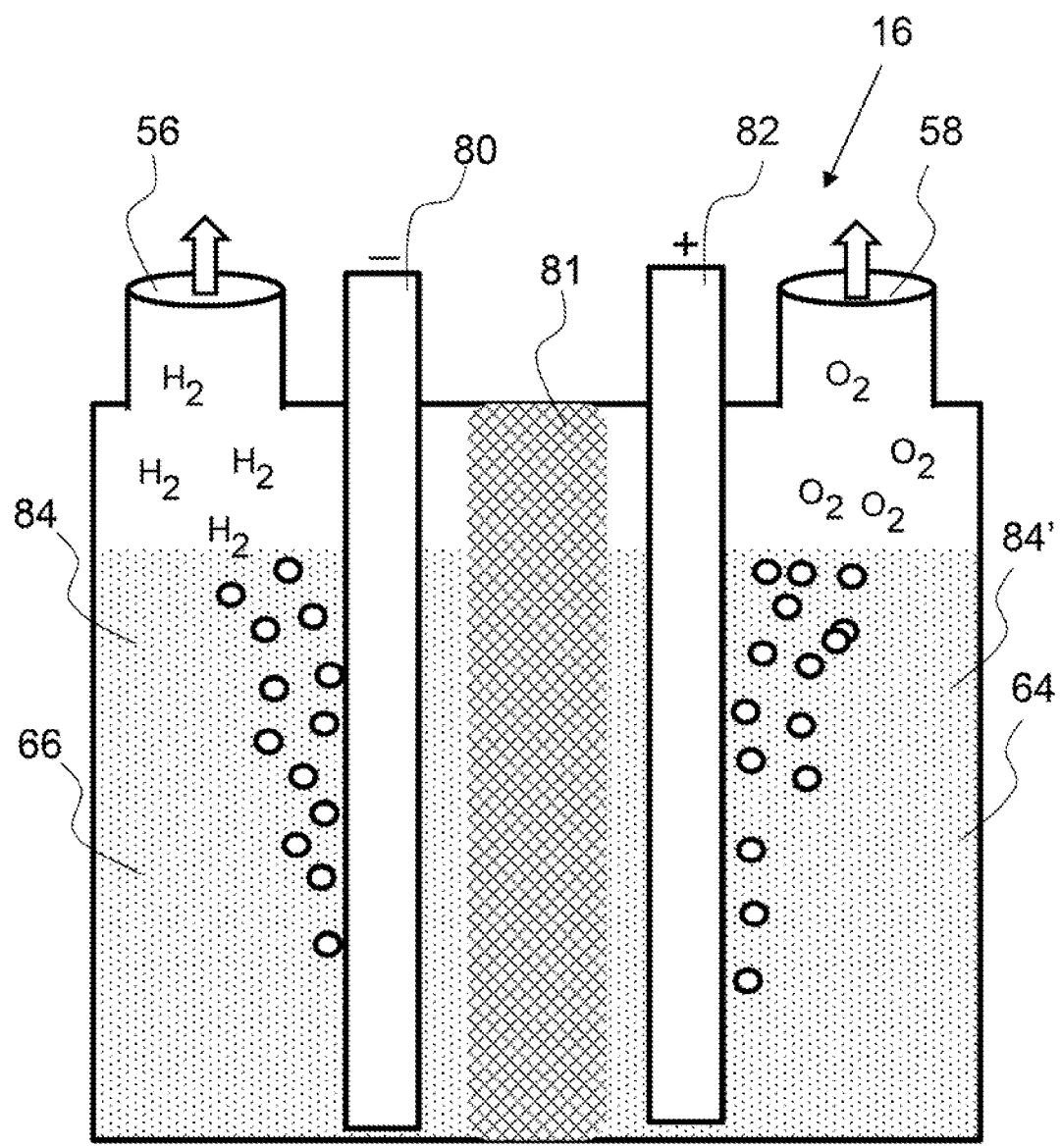
FIG. 5 shows a sectional view of an exemplary electrolyzer.

As shown in FIG. 5, an exemplary electrolyzer 16 comprises a chamber having a diaphragm 81 between and separating an anode side 64 and a cathode side 66. An anode 82 extends down into electrolyte solution 84' and a cathode 80 extends down into electrolyte solution 84. Power is provided to the anode and cathode to drive the electrolysis of water. Hydrogen is produce on the cathode side and exits through the hydrogen outlet 56 and oxygen is produce on the anode side and exits through the oxygen outlet 58.

Figure 6:
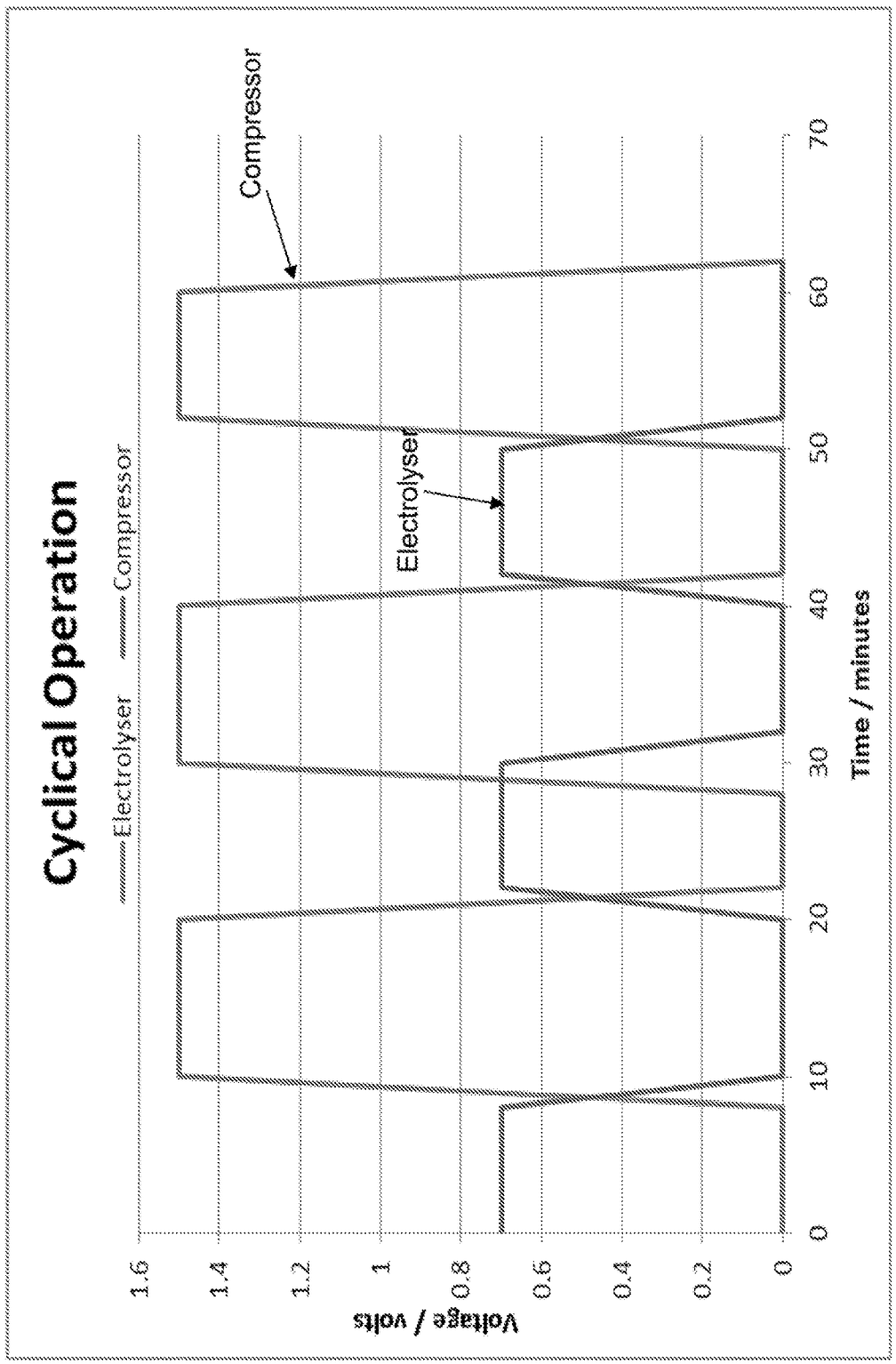
FIG. 6 shows a graph of the electrochemical compressor system operating in a cyclical mode.

As shown in FIG. 6, the electrochemical compressor system may be operated in a cyclical mode, wherein the electrolyzer and the compressor are operated in sequence, one after the other. The waveforms shown in FIG. 6 approximate a square wave control of the electrolyzer and fuel cell and shows an alternating mode wherein the electrolyzer and fuel cell are operated at substantially different times with only a small portion of overlap. The electrolyzer and fuel cell may be operated at the same time with individual cycling modes, each having there own repeating wave form. The electrolyzer and fuel cell may be operated such that there output or voltage is a wave form, and this wave may be a square wave a sinusoidal wave, saw-tooth wave and the like. As discussed herein, the electrolyzer may be powered at least in part by electrical energy generated by the compressor, or fuel cell of the compressor. The electrical energy generated by the fuel cell may be stored in an energy storage device, and then drawn from by the electrolyzer.

Figure 7A:
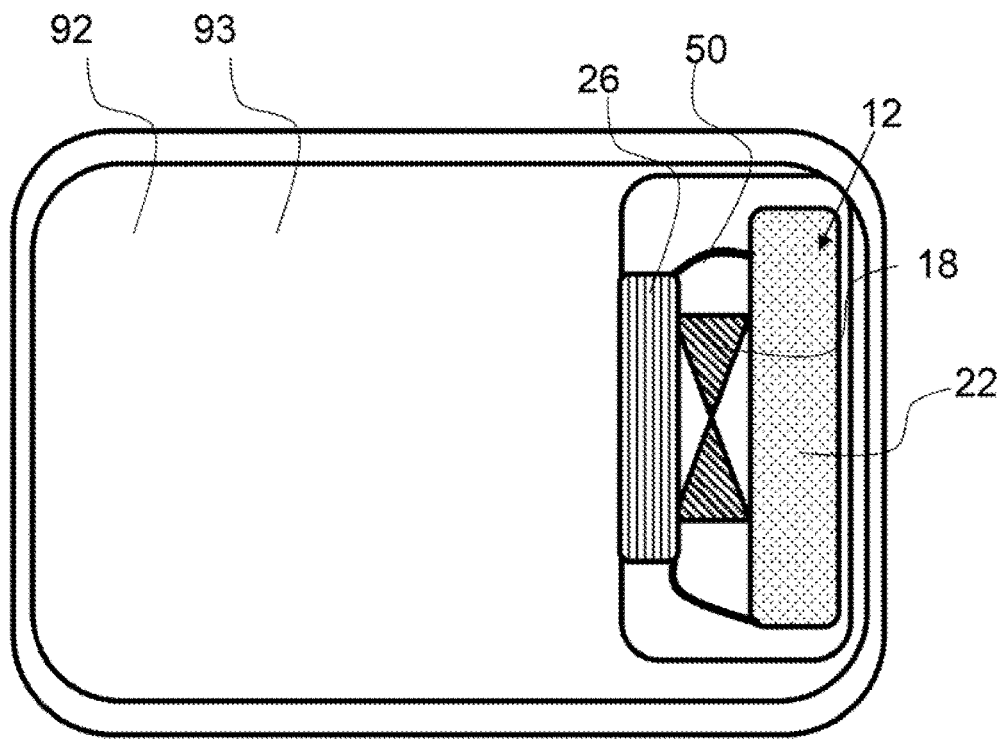
FIG. 7A shows an exemplary electrochemical heat transfer system configured in a refrigerator.

As shown in FIG. 7A, an exemplary electrochemical heat transfer system 12 is configured in a refrigerator 92. The temperature of the enclosure 93 of the refrigerator may be changed by heat transfer from the electrochemical heat transfer system. A fan 18 is configured to blow air over the evaporator 26, a heat transfer device, of the electrochemical heat transfer system to cool the enclosure. The enclosure 93 is a heat reservoir that transfers heat from reservoir to the working fluid. A condenser 22, another heat transfer device is configured to transfer heat form the working fluid outside of the enclosure.

Figure 7B:
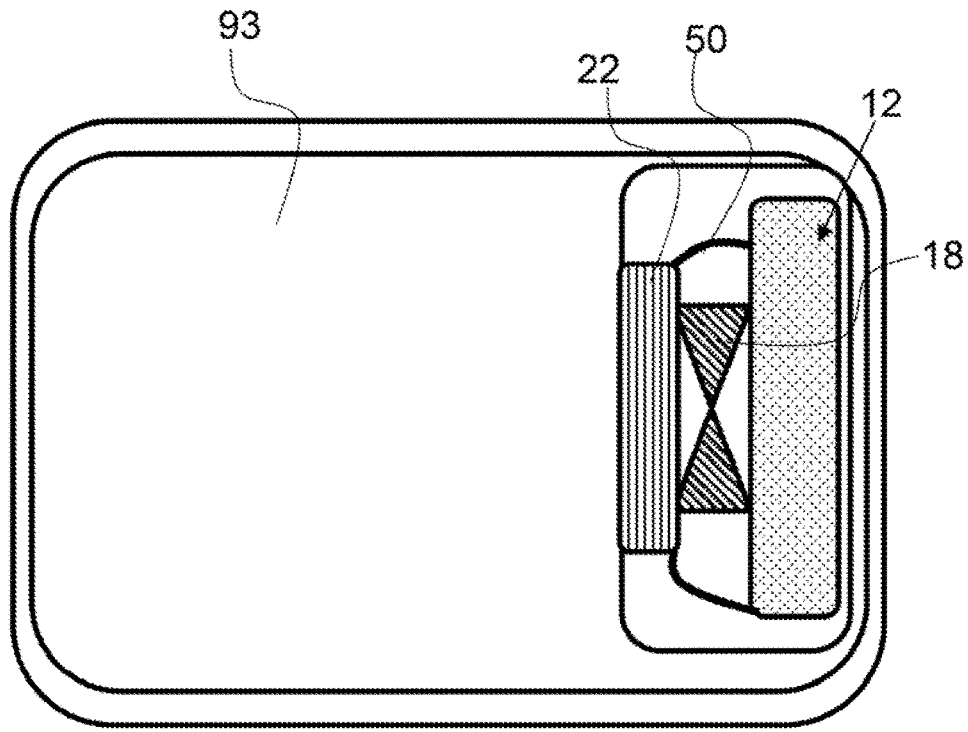
FIG. 7B shows an exemplary electrochemical heat transfer system configured to heat an enclosure, or heat reservoir.

As shown in FIG. 7B, an exemplary electrochemical heat transfer system 12 is configured to heat an enclosure 93. The temperature of the enclosure 93 may be changed by heat transfer from the electrochemical heat transfer system. A fan 18 is configured to blow air over the condenser 22, a heat transfer device, of the electrochemical heat transfer system to heat the enclosure. Heat from the working fluid is transferred into the enclosure, or heat reservoir. The enclosure may be a room within a dwelling, the interior of a vehicle and the like.

The electrochemical compressor raises the pressure of the working fluid which is then delivered to a condenser where the condensable component is precipitated by heat exchange with a sink fluid. The working fluid is then reduced in pressure in a thermal expansion valve. Subsequently, the low pressure working fluid is delivered to an evaporator where the condensed phase of the working fluid is boiled by heat exchange with a source fluid. The evaporator effluent working fluid may be partially in the gas phase and partially in the liquid phase when it is returned from the evaporator to the electrochemical compressor. In the process, heat energy is transported from the evaporator to the condenser and consequently, from the heat source at low temperature to the heat sink at high temperature.

An exemplary electrochemical compressor, as described herein, incorporates an electrolyzer for the production of hydrogen, that is introduced in proximity to the anode section of the compressor. This introduced hydrogen provides the motive source (protons) to drive the working fluid, water, through the compressor and then reacts with oxygen introduced from the electrolyzer in proximity to the cathode section of the compressor. This causes the hydrogen and oxygen to react to form water exiting the high pressure side of the compressor which combines with the electro-osmotic transferred water.

In an exemplary embodiment, the membrane electrode assembly (MEA) utilized in the electrochemical compressor is a classical ionomer membrane with electrodes attached, a membrane electrode assembly, or MEA. The membrane electrode assembly functions as a compressor component in a traditional four-stage refrigeration cycle system, coupled with a classical electrolyzer system where the hydrogen and oxygen output from the electrolyzer are transferred to the anode and cathode areas, respectively, of the compressor to generate a temporary mixed working fluid.

A cell assembled with the components identified above, is then combined to form an electrochemical compressor device, and then subsequently used in a variety of different refrigeration cycles, such as for example, in a refrigerator, or heat pump, or automobile, or electronic cooling application.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What claimed is:

1. An electrochemical heat transfer system that conveys heat from a first heat reservoir at a relatively low temperature to a second heat reservoir at relatively high temperature, the heat transfer system defining a closed loop that contains an electrochemically active working fluid, at least part of the working fluid being circulated through the closed loop, the heat transfer system comprising:
   a first heat transfer device that transfers heat from the first heat reservoir to the working fluid;
   a second heat transfer device that transfers heat from the working fluid to the second heat reservoir;
   an expansion valve between the first and second heat transfer devices that reduces pressure of the working fluid;
   a conduit system; and
   an electrochemical compressor system between the first and second heat transfer devices;
   wherein the electrochemical compressor system comprises:
   a. an electrical power supply;
   b. an electrolyzer that is coupled with the electrical power supply to electrolyze the electrochemically active working fluid at a first pressure into:
      i. a first decomposition product, and
      ii. a second decomposition product;
   c. one or more electrochemical cells, each electrochemical cell comprising:
      an anode side comprising an anode and connected to the electrolyzer to receive the first decomposition product;
      a cathode side comprising a cathode and connected to the electrolyzer to receive the second decomposition product;
      an ion exchange membrane disposed between and in electrical contact with the cathode and the anode to pass the first decomposition product from the anode to the cathode,
      wherein the electrochemically active working fluid is reformed on the cathode side at a second pressure; and
   wherein the second pressure is higher than the first pressure;
   wherein said conduit system receives the electrochemically active working fluid from the cathode side of the one or more electrochemical cells and is coupled with the electrolyzer, wherein the electrochemically active working fluid flows through the conduit system from the cathode side to an inlet to the electrolyzer.

2. The electrochemical heat transfer system of claim 1, wherein the first heat transfer device is an evaporator and the second heat transfer device is a condenser.

3. The electrochemical heat transfer system of claim 1, wherein the electrochemically active working fluid comprises water and wherein the first decomposition product is hydrogen and the second decomposition product is oxygen, and wherein the hydrogen is converted by the anode into protons that are passed through the ion exchange membrane to the cathode where the water is reformed.

4. The electrochemical heat transfer system of claim 1, further comprising:
   a. a first reservoir tank to store the first decomposition component produced by the electrolyzer for subsequent introduction to the anode side of the one or more electrochemical cells; and b. an second reservoir tank to store second decomposition product produced by the electrolyzer for subsequent introduction to the cathode side of the one or more electrochemical cells.

5. The electrochemical heat transfer system of claim 4, further comprising a control system and an interface with a temperature set point input, wherein the control system controls the flow of the first and second decomposition products to the one or more electrochemical cells as a function of the temperature set point input.

6. The electrochemical heat transfer system of claim 1, further comprising a control system and wherein the electrochemical compressor system is operated in a cyclical mode, wherein the electrolyzer and the one or more electrochemical cells operate asynchronously.

* * * * *